United States Patent
Giraud (10) Patent No.: US 11,377,073 B2
(45) Date of Patent: Jul. 5, 2022

(54) SYSTEM FOR CLEANING AN OPTICAL SENSOR, ASSEMBLY COMPRISING SUCH A SYSTEM, AND ASSOCIATED MOTOR VEHICLE

(71) Applicant: Valeo Systèmes d'Essuyage, Le Mesnil Saint Denis (FR)

(72) Inventor: Frédéric Giraud, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 885 days.

(21) Appl. No.: 16/304,921

(22) PCT Filed: Apr. 25, 2017

(86) PCT No.: PCT/EP2017/059771
§ 371 (c)(1),
(2) Date: Nov. 27, 2018

(87) PCT Pub. No.: WO2017/202562
PCT Pub. Date: Nov. 30, 2017

(65) Prior Publication Data
US 2021/0221336 A1 Jul. 22, 2021

(30) Foreign Application Priority Data

May 27, 2016 (FR) ..................................... 1654760

(51) Int. Cl.
*B08B 3/02* (2006.01)
*B60S 1/56* (2006.01)
(Continued)

(52) U.S. Cl.
CPC ...... *B60S 1/56* (2013.01); *B08B 3/02* (2013.01); *B08B 3/14* (2013.01); *B08B 13/00* (2013.01);
(Continued)

(58) Field of Classification Search
CPC ......... B60S 1/56; H04N 5/22521; B08B 3/02; B08B 3/14; B08B 13/00; B08B 2203/0264; B08B 2203/027
(Continued)

(56) References Cited

FOREIGN PATENT DOCUMENTS

CN 102143866 A 8/2011
CN 102381286 A 3/2012
(Continued)

OTHER PUBLICATIONS

FR3027007A1—machine translation (Year: 2016).*
(Continued)

*Primary Examiner* — Tinsae B Ayalew
(74) *Attorney, Agent, or Firm* — Osha Bergman Watanabe & Burton LLP (57) ABSTRACT

The present invention relates to a system (1) for cleaning an optical sensor (3), notably of a motor vehicle, comprising: —an element (5) for spraying a cleaning liquid, —a tank (7) of cleaning liquid fluidically connected to the element (5) for spraying cleaning liquid, —a pump (9) configured to pump the cleaning liquid from the tank (7) to the element (5) for spraying the cleaning liquid, the system (1) also comprising a containment wall (11) for the cleaning liquid, which is movable between a retracted position in which the containment wall is configured to be positioned outside the field of view of the optical sensor (3) and a cleaning position in which the containment wall (11) is configured to be positioned in front of the optical sensor (3) so as to define a collection vessel (13) for the cleaning liquid, and in that it comprises an evacuation pipe (15) for the cleaning liquid that is connected both to the collection vessel (13) in the cleaning position and to the tank (7) of cleaning liquid.

15 Claims, 5 Drawing Sheets

(51) Int. Cl.
*H04N 5/225* (2006.01)
*B08B 3/14* (2006.01)
*B08B 13/00* (2006.01)

(52) U.S. Cl.
CPC .... *H04N 5/22521* (2018.08); *B08B 2203/027* (2013.01); *B08B 2203/0264* (2013.01)

(58) Field of Classification Search
USPC ...................................... 134/104.4
See application file for complete search history.

(56) References Cited

FOREIGN PATENT DOCUMENTS

| | | | |
|---|---|---|---|
| CN | 105128826 A | 12/2015 | |
| DE | 102014116681 A1 | 5/2016 | |
| DE | 102014117165 A1 | 5/2016 | |
| EP | 3006279 A1 | 4/2016 | |
| FR | 3027007 A1 * | 4/2016 | ............... B60S 1/56 |
| JP | 2008179244 A | 8/2008 | |
| JP | 2013100077 A | 5/2013 | |
| JP | 2014215418 A | 11/2014 | |
| WO | 2016074933 A1 | 5/2016 | |

OTHER PUBLICATIONS

International Search Report and Written Opinion Issued in Corresponding Application No. PCT/EP2017/059771, dated Jun. 21, 2017 (10 Pages with English Translation of International Search Report).
The First Office Action issued in corresponding Chinese Application No. 201780041938.X, dated Jul. 5, 2021 (15 pages).

* cited by examiner

Fig. 10

SYSTEM FOR CLEANING AN OPTICAL SENSOR, ASSEMBLY COMPRISING SUCH A SYSTEM, AND ASSOCIATED MOTOR VEHICLE The present invention relates to the field of optical sensors and in particular optical sensors intended to be mounted on a motor vehicle, and more precisely systems for cleaning such optical sensors.

Nowadays, rear-view cameras are fitted on many modern motor vehicles, and form part in particular of a parking assistance system that makes it possible to park in a space more easily without having to turn around and detect obstacles behind the vehicle. Cameras are also used on the front of the vehicle or on the sides, replacing or supplementing rear-view mirrors, in order to improve the driver's view.

Backup cameras installed inside the car interior against the rear windshield/glass and that point backward from the rear windshield of the vehicle are known. These cameras are well protected against external climatic influences and may for example benefit from systems for defrosting and cleaning the rear windscreen, for example a heating wire integrated into the pane of the rear windscreen.

However, the viewing angle is not optimal, in particular for parking assistance, and for this reason it is preferred for the camera to be arranged on the rear bumper or on the rear license plate of the vehicle.

In this case, the camera is therefore highly exposed to projections of dirt that may build up on its optics and thus reduce its effectiveness, or even make it inoperative.

In particular, in periods of wet weather or when there is snow in winter, projections of rain, dirt, salts or snow occur that can have a significant adverse effect on the functioning of the viewing system.

There thus appears to be a need to clean these viewing systems regularly in order to ensure optimal functioning.

In point of fact, in particular if the vehicle comprises a plurality of optical sensors, a significant amount of cleaning liquid may be required, which means that the reservoir of cleaning liquid has to be very large in order to avoid the user of the vehicle having to fill the reservoir of cleaning liquid too often.

However, a reservoir of large size needs a large volume that is not necessarily available in a vehicle.

The present invention thus aims to solve this problem at least in part by reducing the consumption of liquid needed for cleaning the optical sensors.

To that end, the present invention relates to a system for cleaning an optical sensor, in particular for a motor vehicle, comprising:
  an element for projection of a cleaning liquid,
  a reservoir of a cleaning liquid in fluid communication with the element for projection of cleaning liquid,
  a pump designed to pump the cleaning liquid from the reservoir toward the element for projection of cleaning liquid,
the system also comprising a wall for confinement of the cleaning liquid that is able to move between a retracted position, in which the confinement wall is designed to be positioned outside of the field of view of the optical sensor, and a cleaning position, in which the confinement wall is designed to be positioned in front of the optical sensor such as to define a recovery enclosure for the cleaning liquid, and in that it comprises a discharge conduit for the cleaning liquid connected, on the one hand, to the recovery enclosure in the cleaning position and, on the other, to the reservoir of the cleaning liquid.

Additionally and independently, a number of particular aspects of different implementations of the invention will now be described.

According to one aspect of the present invention, the confinement wall has a substantially spherical cap form, the concave part of which is designed to be oriented toward the optical sensor.

According to an additional aspect of the present invention, the recovery enclosure is positioned higher than the reservoir when the system is in the assembled state such that the cleaning liquid flows under gravity from the enclosure for recovery of the cleaning liquid toward the reservoir.

According to an additional aspect of the present invention, the system comprises an additional pump arranged in the conduit for discharge of the cleaning liquid. This latter is designed, in particular, for pumping the cleaning liquid from the enclosure for recovery of the cleaning liquid toward the reservoir.

According to another aspect of the present invention, the system also comprises a filter arranged in the conduit for discharge of the cleaning liquid for filtering out dirt particles, in particular particles that are in excess of a predetermined size.

According to an additional aspect of the present invention, the system comprises a support of the optical sensor. At least a part of the discharge conduit is, for example, integrated into the support of the optical sensor.

According to an additional aspect of the present invention, the projection element is borne by the confinement wall.

According to another aspect of the present invention, the projection element is positioned on the confinement wall such as to lie facing the optical sensor in the cleaning position.

According to an additional aspect of the present invention, the confinement wall comprises an internal supply duct connected in a fluid manner to the projection element.

According to an additional aspect of the present invention, the confinement wall is able to move in rotation.

According to another aspect of the present invention, the system comprises an actuator for moving the confinement wall between the retracted position and the cleaning position.

According to an additional aspect of the present invention, the actuator is an electric actuator, in particular an output shaft coupled to the confinement wall.

According to an additional aspect of the present invention, the actuator comprises a hydraulic ram.

According to another aspect of the present invention, the hydraulic ram comprises:
  a ram body comprising an input end fitting intended to be in fluid communication with the pump and an output end fitting intended to be in fluid communication with the projection element,
  a piston separating the ram body into a first chamber in fluid communication with the input end fitting and a second chamber, said piston being able to move, on the one hand, between a proximal position, in which the volume of the first chamber is minimal and in which the output end fitting is in fluid communication with the second chamber, and, on the other, a distal position, in which the volume of the first chamber is maximal and in which the output end fitting is in fluid communication with the first chamber such as to supply the projection element with cleaning liquid, the movement of the piston from the proximal position to the distal position being generated by the cleaning liquid pumped by the pump.

According to an additional aspect of the present invention, the hydraulic ram comprises an elastic return means arranged in the second chamber. The return means is designed in particular to generate the movement of the piston from the distal position to the proximal position, in particular when the pump is inactive.

According to an additional aspect of the present invention, the projection element is a squirter designed in particular to spray a cleaning liquid at an inlet pressure into the squirter of between 1 and 1.7 bar.

According to another aspect of the present invention, the system also comprises a processing unit designed to activate the pump. This latter is, for example, activated for a first predetermined period of time when a cleaning command is received.

According to an additional aspect of the present invention, the processing unit is also designed to activate the additional pump. This latter is, for example, activated for a second predetermined period of time when a cleaning command is received.

The present invention also relates to an assembly comprising an optical sensor and a system for cleaning the optical sensor as described above.

The present invention also relates to a motor vehicle comprising an assembly as described above.

Further features and advantages of the invention will become more clearly apparent from reading the following description, given by way of example and in no way limiting, in reference to the appended drawings, in which.

In all the figures, elements having identical functions bear the same reference numbers.

In the remainder of the description, the expression "upstream" or "downstream", when denoting elements of a hydraulic device, denote a fore or aft position of one element relative to another, taken in the direction of flow of the liquid or fluid.

The following embodiments are examples. Although the description refers to one or more embodiments, this does not necessarily mean that each reference relates to the same embodiment, or that the features apply only to just one embodiment. Single features of different embodiments can also be combined or interchanged in order to create other embodiments.

Figure 1:
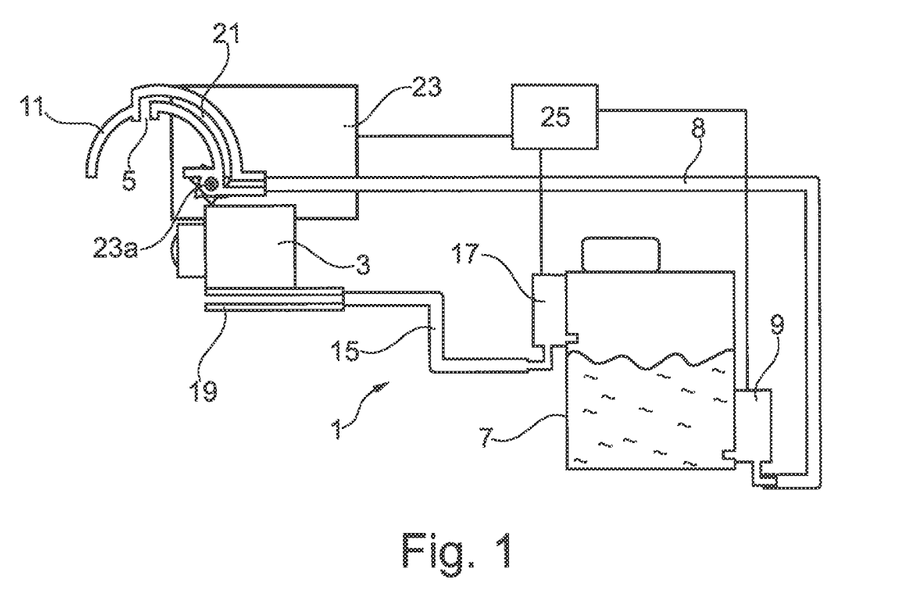
FIG. 1 shows a schematic diagram of a system for cleaning an optical sensor according to a first embodiment and in a retracted position.
Figure 8:
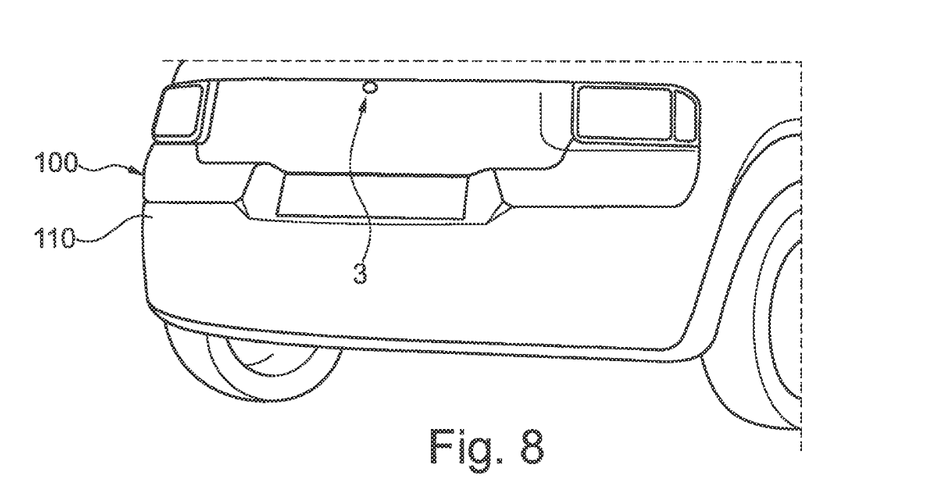
FIGS. 8, 9 and 10 show schematic diagrams of a motor vehicle comprising an optical sensor at different locations on the vehicle.
Figure 9:
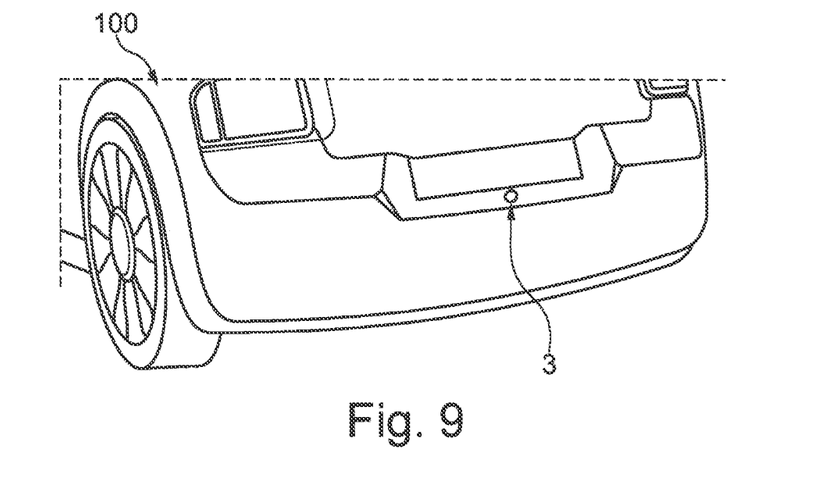
Figure 10:
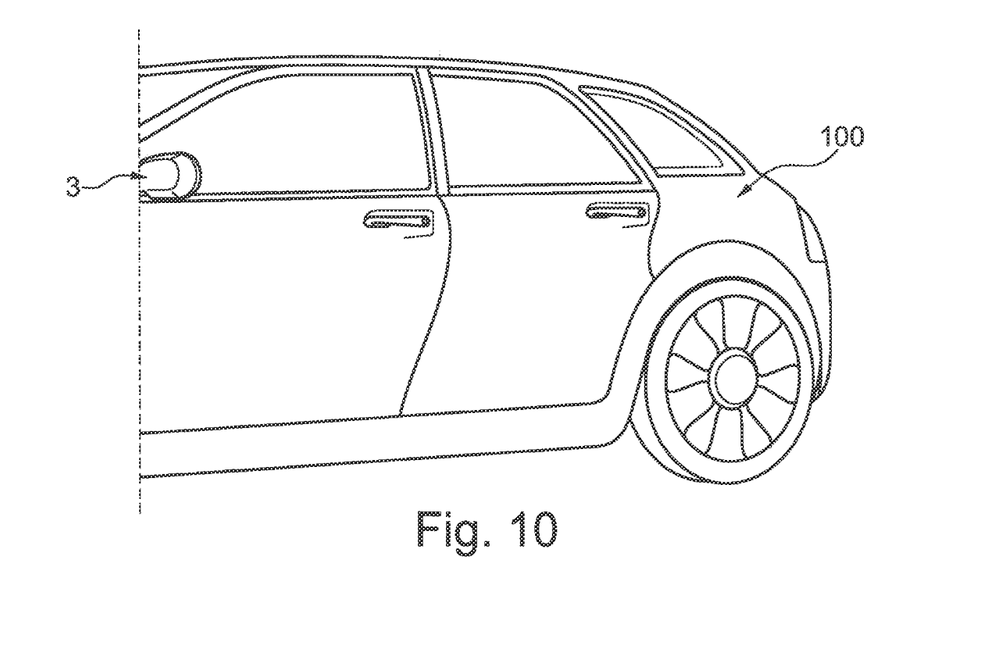

FIG. 1 shows an example of an optical sensor 3 and a system 1 for cleaning the optical sensor 3 according to a first embodiment. Such a cleaning system 1 is in particular intended for installation on a motor vehicle 100, the optical sensor 3 being, for example, a backup camera on a rear face (rear bumper 110, license plate, trunk lid, etc.) of the vehicle 100, as shown in FIG. 8. However, other types of optical sensor 3 and other locations on the vehicle may be used, such as, for example, a front face, as shown in FIG. 9, or a side door, as shown in FIG. 10.

The optical sensor 3 includes, for example, a convex (domed) lens, such as one called a fish-eye lens in English.

The cleaning system 1 comprises an element 5, for projection of a cleaning liquid, designed to spray the cleaning liquid onto the lens of the optical sensor 3 at the time when the optical sensor 3 is cleaned. The projection element 5 is, for example, embodied as a squirter for spraying a cleaning liquid at a pressure of between 1 and 1.7 bar or as a spray nozzle allowing the cleaning liquid to be sprayed onto the optical sensor 3.

The cleaning system 1 also comprises a reservoir 7, for the cleaning liquid, that is in fluid communication with the projection element 5, for example via a supply line 8.

The cleaning system 1 also comprises at least one pump 9 designed to pump the cleaning liquid from the reservoir 7 and to supply the projection element 5 with cleaning liquid from the reservoir 7. The pump 9 is, for example, an electric pump. The supply line 8 may comprise a non-return valve designed to prevent the cleaning liquid from returning from the projection element 5 toward the pump 9 when the pump 9 is inactive. By way of non-limiting example, the pump 9 here is arranged at the reservoir 7, at the interface with the supply line 8, but other arrangements of the pump 9 may also be chosen.

The cleaning system 1 also comprises a wall 11, for confinement of the cleaning liquid, that is able to move between a retracted position, in which the confinement wall 11 is positioned outside the field of view of the optical sensor 3, and a cleaning position, in which the confinement wall 11 is positioned in front of the optical sensor 3 such as to define an enclosure 13 for recovery of the cleaning liquid in the assembled state of the cleaning system 1.

Figure 2:
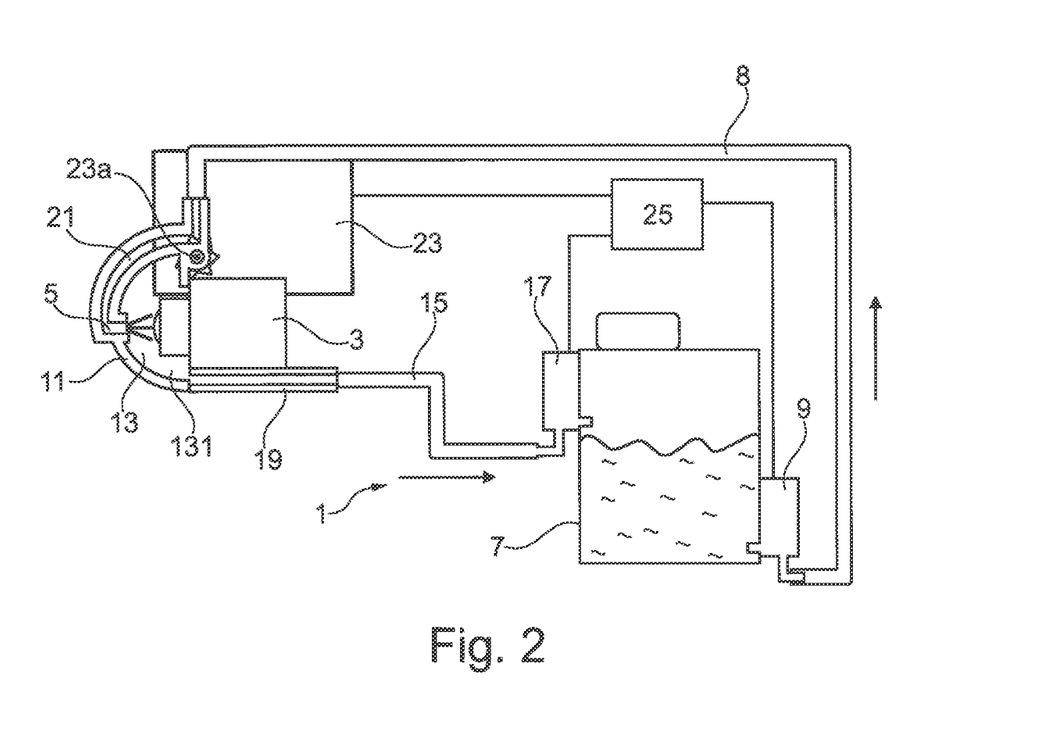
FIG. 2 shows a schematic diagram of a system for cleaning an optical sensor according to the first embodiment and in a cleaning position.
Figure 3:
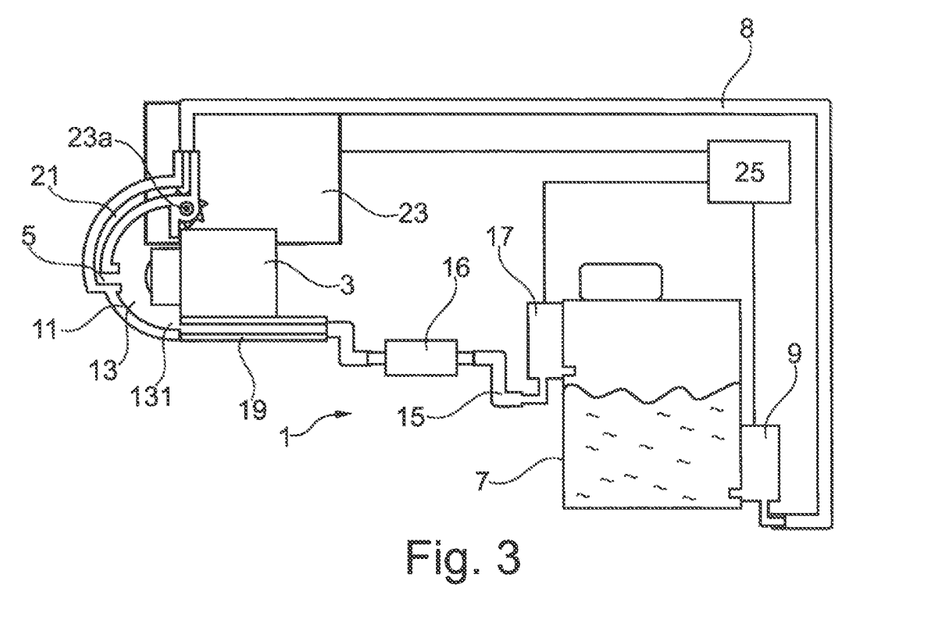
FIG. 3 shows a schematic diagram of a system for cleaning an optical sensor according to a variant of the first embodiment and in a cleaning position.

According to first and second embodiments, described in FIGS. 1 to 5, the confinement wall 11 is mounted such that it is able to move in rotation or, more specifically, in a pivoting manner. In FIGS. 1 to 3, the confinement wall 11 is driven by an actuator 23. The confinement wall 11 is then couple to the actuator 23, which allows pivoting thereof between the retracted position, shown in FIG. 1, and the cleaning position, shown in FIG. 2.

The confinement wall 11 has, for example, a spherical cap form, the concave part of which is oriented toward the optical sensor 3 in the cleaning position. However, other forms may also be used. The confinement wall 11 thus forms an enclosure 13, for recovery of the cleaning liquid, in front of the optical sensor 3.

The confinement wall 11 may also bear the projection element 5. The projection element 5 is, for example, positioned on the confinement wall 11 such as to lie facing the lens of the optical sensor 3 in the cleaning position, as shown in FIG. 2.

The projection element 5 may also be integrated into the confinement wall 11. In such a case, an internal supply duct 21 may be made in the confinement wall 11, in fluid connection with the projection element 5. The internal supply duct 21 then connects the projection element to the supply line 8. The supply line 8 is, for example, flexible, in order to accommodate the movements of the confinement wall 11.

Alternately, the supply line 8 may be secured to the confinement wall 11 as far as the projection element 5, for example by means of clips or keeper hooks, or any other securing means familiar to a person skilled in the art.

The cleaning system 1 also comprises a discharge conduit 15 for the cleaning liquid that is connected to the recovery enclosure 13 in the cleaning position and designed to make it possible to recover the cleaning liquid after cleaning of the optical sensor 3 and to allow the return of the cleaning liquid toward the reservoir 7.

The discharge conduit 15 is, for example, connected, in the cleaning position, to a low part 131 of the recovery enclosure 13 when the cleaning system 1 is in the assembled state such that the cleaning liquid flows under gravity into the recovery enclosure 13 toward the discharge conduit 15.

The discharge conduit 15 is, for example, placed below the optical sensor 3 (in the assembled state of the cleaning system 1) and the confinement wall 11 comes into contact with the discharge conduit 15 in the cleaning position. A seal or a flexible material may be used at the interface between the confinement wall 11 and the discharge conduit 15.

Furthermore, the discharge conduit 15 may be integrated at least partially into a support 19 of the optical sensor 3. The support 19 is, for example, placed under the optical sensor 3 and comprises an internal duct, produced, for example, by moulding, allowing the cleaning liquid to flow.

Alternately, the discharge conduit 15 may be secured to the support 19 of the optical sensor 3, for example by clips or keeper hooks or any other securing means familiar to a person skilled in the art.

The flow of the cleaning liquid in the discharge conduit 15 of the recovery enclosure 13 as far as the reservoir 7 may be achieved under gravity. In such a case, the reservoir 7 will be positioned at a height below the optical sensor 3 (in the assembled state of the cleaning system 1) and the recovery enclosure 13. In such a case, the discharge conduit 15 will have an orientation that is inclined toward the reservoir 7.

The flow in the discharge conduit 15 may also be achieved through the action of the pump 9. In such a case, the elements of the cleaning system 1, and in particular the confinement wall 11, will be designed such as to obtain a hermetically closed system in which the cleaning liquid circulates.

Alternately, as shown in FIGS. 1 to 3, an additional pump 17 may be arranged at the discharge conduit 15 in order to draw the cleaning liquid from the recovery enclosure 13 and to pump it as far as the reservoir 7.

As shown in FIG. 3, a filter 16 may also be arranged in the discharge conduit 15 such as to filter out dirt particles of a size greater that a predetermined size. In the case of a cleaning system 1 that comprises an additional pump 17, the filter 16 is positioned upstream of the additional pump 17, which makes it possible to protect the additional pump 17. The filter 16 is, for example, embodied as a charcoal filter or an ultraviolet filter or any other known type of prior-art filter.

According to the embodiments of FIGS. 1 to 3, the actuator 23 may be an electric actuator, in particular an electric motor having an output shaft 23a, designed to move the confinement wall 11 between the retracted position and the cleaning position.

Figure 4:
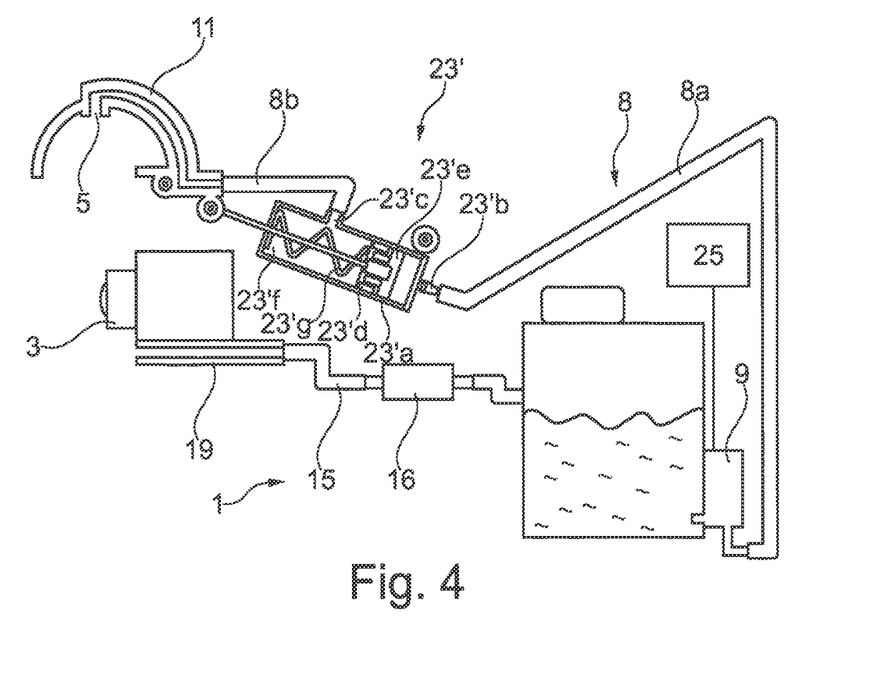
FIG. 4 shows a schematic diagram of a system for cleaning an optical sensor according to a second embodiment and in a retracted position.
Figure 5:
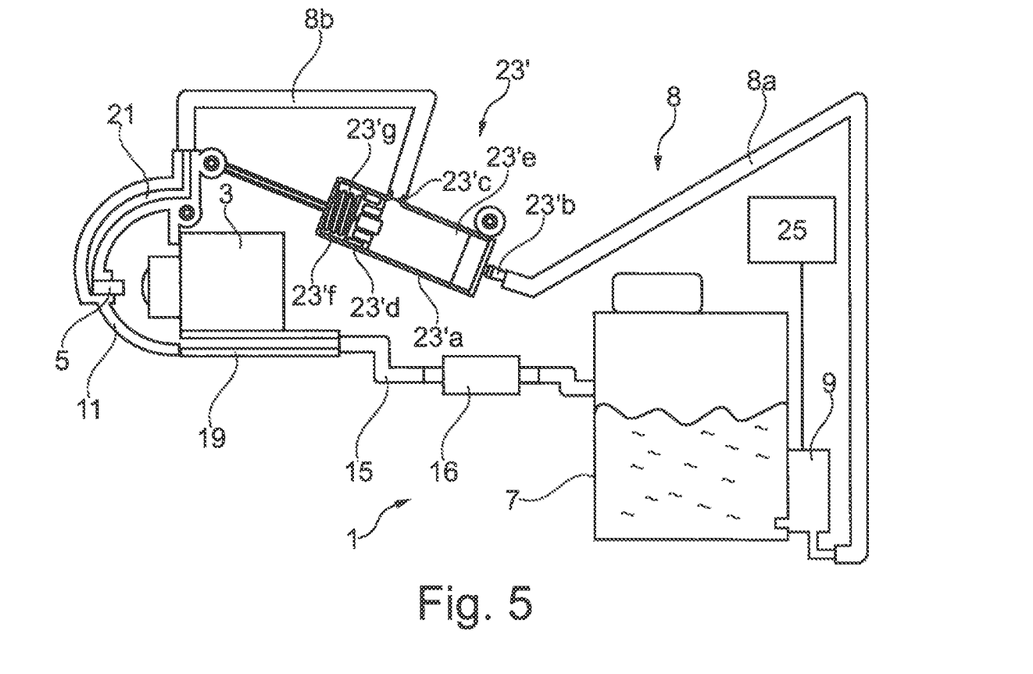
FIG. 5 shows a schematic diagram of a system for cleaning an optical sensor according to the second embodiment and in a cleaning position.

According to a second embodiment, shown in FIGS. 4 and 5, the actuator 23 may be a hydraulic actuator embodied in the form of a hydraulic ram 23'.

The hydraulic ram 23' comprises a ram body 23'a, for example of cylindrical form, comprising an inlet end fitting 23'b connected in a fluid manner to the pump 9 via a first part 8a of the supply line 8 and an outlet end fitting 23'c connected in a fluid manner to the projection element 5 via a second part 8b of the supply line 8.

The inlet end fitting 23'b is, for example, located at a first end of the ram body 23'a. The outlet end fitting 23'c is, for example, located on a lateral edge of the ram body 23'a.

The hydraulic ram 23' also comprises a piston 23'd separating the ram body 23'a into a first chamber 23'e and a second a chamber 23'f.

The first chamber 23'e is in fluid communication with the inlet end fitting 23'b such as to receive the cleaning liquid pumped into the first part 8a of the supply line 8 by the pump 9.

An elastic return means 23'g, for example, a helical spring, is arranged in the second chamber 23'f.

The piston 23'd is able to move between a proximal position and a distal position. In the proximal position, shown in FIG. 4, the volume of the first chamber 23'e is minimal and the outlet end fitting 23'c is in fluid communication with the second chamber 23'f. In the distal position, shown in FIG. 5, the volume of the first chamber 23'e is maximal and the outlet end fitting 23'c is in fluid communication with the first chamber 23'e. Thus, in the distal position, the cleaning liquid is transferred from the first chamber 23'c toward the second part 8b of the supply line 8 such as to supply the projection element 5 with cleaning liquid.

The movement of the piston 23'd from the proximal position to the distal position is generated by the cleaning liquid pumped by the pump 9. Furthermore, the piston 23'd is connected to the confinement wall 11, for example by means of a pivot link, such that the movement of the piston 23'd from the proximal position to the distal position generates the movement of the confinement wall 11 from the retracted position to the cleaning position. Thus, with a hydraulic ram 23' of this type, actuation of the pump 9 simultaneously allows the confinement wall 11 to move into the cleaning position and the projection element 5 to be supplied with cleaning liquid.

The elastic return means 23'g is designed to generate the movement of the piston 23'd from the distal position to the proximal position when the pump 9 is inactive.

FIGS. 4 and 5 also differ from FIGS. 1 to 3 on account of the absence of an additional pump 17. In such a case, the cleaning liquid flows under gravity from the recovery enclosure 13 toward the reservoir 7, as described above. Apart from the actuator 23 and the additional pump 17, the cleaning system 1 of FIGS. 4 and 5 is similar to the cleaning system described on the basis of FIGS. 1 to 3.

The cleaning system 1 may also comprise a processing unit 25 designed to control at least one of the following active elements:
the pump 9,
the additional pump 17, and
the actuator 23.

The processing unit 25 is connected by means of a communication interface, such as a wired link or wireless communication means, for example via electromagnetic waves such as a WiFi interface, to one or more active elements to be controlled.

The processing unit 25 is designed to receive a cleaning command and to actuate the pump 9 for a first predetermined period of time.

In the case of a cleaning system 1 comprising an electric actuator 23, the processing unit 25 also commands the electric actuator 23 in order to position the confinement wall 11 in the cleaning position before or at the same time as actuation of the pump 9. In the case of a cleaning system 1 comprising an additional pump 17, the processing unit 25 also commands actuation of the additional pump 17 for a second predetermined period of time. The second predetermined period of time is, for example, longer than the first predetermined period of time in order to allow discharge of the cleaning liquid at the end of the first predetermined period of time. The second predetermined period of time may also have the same duration as the first predetermined period of time, but may be offset in time relative to the first period of time in order that the additional pump 17 can continue to be actuated for a predetermined period of time when the pump 9 is deactivated, such as to allow recovery of the used cleaning liquid.

In the case of a cleaning system 1 comprising a hydraulic actuator 23', only the pump 9 and, as appropriate, the additional pump 17 are controlled by the processing unit 25. The predetermined period of time for which the pump 9 is activated may be longer in this embodiment.

The cleaning command received by the processing unit 25 may be a command initiated by a user, for example via a command element on the dashboard, or may be initiated automatically. The automatic command may be a command at regular intervals of time or a command based on a particular instance of detection or even a combination of the two. For example, cleaning may be initiated at the start or at the end of each use of the optical sensor 3. Cleaning may also be commanded after a predetermined duration of use of the optical sensor 3. This predetermined duration being capable of being modified when certain conditions, for example when rainy conditions, are detected. Rain being detected via, for example, a dedicated sensor that may also be used for controlling the windshield wipers. An image-processing device may also be associated with the optical sensor 3 in order to detect whether cleaning is necessary.

According to an alternate embodiment, the processing unit 25 may be located outside of the cleaning system 1, for example at a central unit of the motor vehicle.

Figure 6:
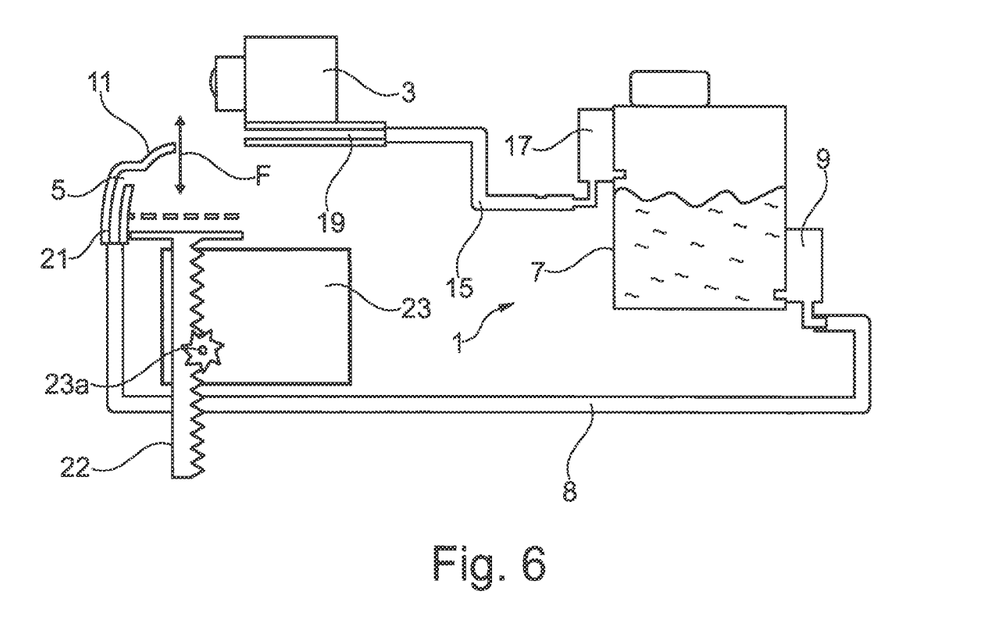
FIG. 6 shows a schematic diagram of a system for cleaning an optical sensor according to a third embodiment and in a retracted position.
Figure 7:
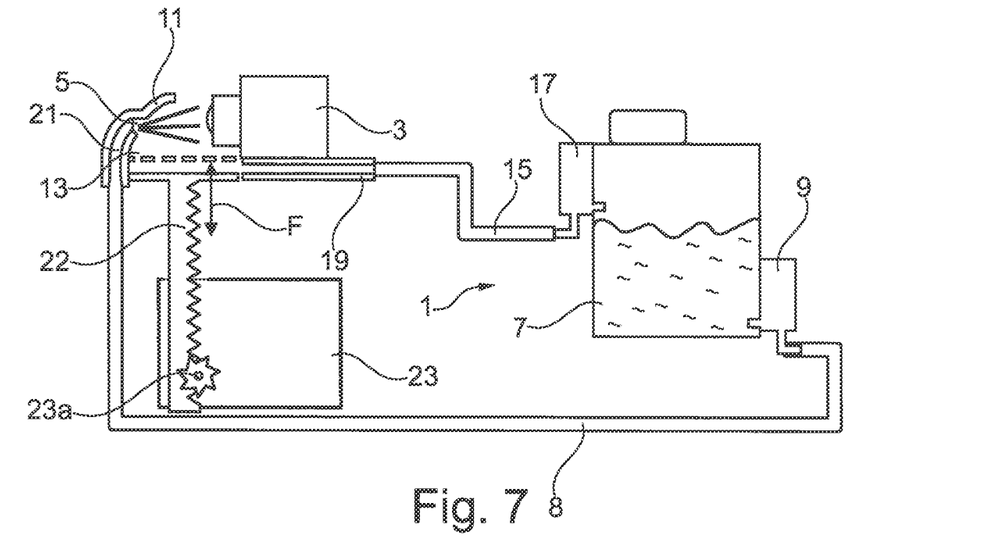
FIG. 7 shows a schematic diagram of a system for cleaning an optical sensor according to a third embodiment and in a cleaning position.

According to a third embodiment, shown in FIGS. 6 and 7, the confinement wall 11 may also be able to move in translation. In this case, a toothed wheel is, for example, mounted on the output shaft 23a of the actuator 23, for example an electric actuator, and a rack 22 is connected to the confinement wall 11 in order to allow the movement thereof in translation, as indicated by the arrow F. Thus, the confinement wall 11 is moved upward in order to move from the retracted position (FIG. 6) to the cleaning position (FIG. 7). In the cleaning position, shown in FIG. 7, the projection element 5 lies facing the lens of the optical sensor 3 such that actuation of the pump 9 generates the projection of the cleaning liquid onto the lens of the optical sensor 3. The cleaning liquid then flows under gravity toward the bottom of the confinement wall 11 and then toward the discharge conduit 15. The confinement wall 11 is, for example, inclined in order to allow the cleaning liquid to flow toward the discharge conduit 15. Functioning is similar to the first variant of the first embodiment described in FIGS. 1 to 3, apart from the movement of the confinement wall 11.

The present invention also relates to an assembly comprising an optical sensor 3 and a system 1 for cleaning the optical sensor 3 as described above, it being possible for the assembly to comprise a support 19 of the optical sensor 3.

The present invention also relates to a motor vehicle 100 comprising at least one optical sensor 3 and at least one cleaning system 1 associated with the optical sensor 3. Different sites for the optical sensor 3 are shown in FIGS. 8 to 10, in particular at a luggage compartment door, a front bumper or a side opening, but other sites on the vehicle can also be envisaged for the installation of an assembly comprising an optical sensor 3 and an associated cleaning system 1. In the case of a vehicle 100 comprising a plurality of optical sensors 3, these latter may be arranged at different sites on the vehicle, for example at a front bumper, a rear bumper or a side door. Furthermore, elements of the cleaning system 1 may be shared by a plurality of optical sensors 3. A single reservoir 7 may, for example, be used for a plurality of or for all the optical sensors 3 on the vehicle. The processing unit 25 may also be shared by different optical sensors 3.

The different parts of the supply line 8 and/or of the discharge conduit 15 may be co-extruded, i.e. they may be manufactured as a single line and then cut to the required length in order to reduce the costs of manufacturing the cleaning system 1.

The way in which the cleaning system 1 functions will now be described in the case of the two embodiments (with an electric actuator and with a hydraulic actuator).

1) Functioning with an Electric Actuator (FIGS. 1 to 3)

When a cleaning command is received by the processing unit 25, this latter activates the electric actuator 23 in order to move the confinement wall 11 from the retracted position (FIG. 1) to the cleaning position (FIG. 2), such that the projection element 5 lies facing the optical sensor 3 and a recovery enclosure 13 is formed around the optical sensor 3. Next, the processing unit 25 activates the pump 9 such that cleaning liquid is pumped from the reservoir 7 as far as the projection element 5 via the supply line 8. The cleaning liquid is then sprayed onto the optical sensor 3, as shown in FIG. 2. The first predetermined period of time of activation of the pump 9 lasts, for example, for a few seconds (for example, 5 seconds). The cleaning liquid then flows over the optical sensor 3 and, as appropriate, over the confinement wall 11 toward the bottom part 131 of the recovery enclosure 13. The cleaning liquid is then received by the discharge conduit 15, one end of which is located at the bottom part 131 of the confinement enclosure 13, in order to be redirected toward the reservoir 7. When the cleaning system 1 comprises an additional pump 17, this latter is likewise activated by the processing unit 25 for a second predetermined period of time, for example ten seconds, to allow or to facilitate the return of the cleaning liquid toward the reservoir 7 via the discharge conduit 15. Once cleaning is complete, i.e. at the end of the first predetermined period of time, the processing unit 25 commands the electric actuator 23 to move the confinement wall 11 from the cleaning position (FIG. 2) to the retracted position (FIG. 1) such as to free up the field of view of the optical sensor 3 and to allow it to be used.

2) Functioning with a Hydraulic Actuator (FIGS. 4 and 5)

When a cleaning command is received by the processing unit 25, this latter activates the pump 9 such that cleaning liquid is pumped from the reservoir 7 toward the hydraulic ram 23' via the first part 8a of the supply line 8. The pumped cleaning liquid then generates the movement of the piston 23'd from its proximal position (FIG. 4) toward its distal position (FIG. 5), compressing the elastic return means 23'g. The move of the piston 23'd into the distal position allows, on the one hand, the move of the confinement wall 11 from the retracted position (FIG. 4) to the cleaning position (FIG. 5) such that the projection element 5 lies facing the optical sensor 3 and a recovery enclosure 13 is formed around the optical sensor 3 and, on the other, the supply of cleaning liquid to the projection element 5 via the second part 8*b* of the supply line 8. Cleaning liquid is then sprayed onto the optical sensor 3. The first predetermined period of time of activation of the pump 9 lasts, for example, for a few seconds. The cleaning liquid then flows over the optical sensor 3 and over the confinement wall 11, in the case of the particles that have been removed from the optical sensor 3 or have run from the projection element 5 toward the bottom of the recovery enclosure 13. The cleaning liquid is then received by the discharge conduit 15, one end of which is located at the bottom part of the confinement enclosure 13, in order to be redirected toward the reservoir 7. When the cleaning system 1 comprises an additional pump 17, this latter is likewise activated by the processing unit 25 for a second predetermined period of time, for example a few seconds, to allow or to facilitate the return of the cleaning liquid toward the reservoir 7 via the discharge conduit 15. Once cleaning is complete, i.e. at the end of the first predetermined period of time, the processing unit 25 deactivates the pump 9. The elastic return means 23'*g* then relaxes in order to move the piston 23'*d* from its distal position toward its proximal position, which generates the movement of the confinement wall 11 from the cleaning position (FIG. 5) to the retracted position (FIG. 4) such as to free up the field of view of the optical sensor 3 and to allow it to be used.

Thus, the cleaning system 1 of the present invention allows efficient cleaning of the lens of the optical sensor 3 by virtue of the ability of the projection element 5, which lies facing the optical sensor 3 upon cleaning, to move and also makes it possible to greatly reduce the consumption of cleaning liquid by virtue of the confinement wall 11 that allows recovery of this cleaning liquid and the return thereof toward the reservoir 7 for re-use at the time of subsequent cleaning. The use of a filter 16 upstream of the reservoir 7 enables the cleaning liquid to be kept clean over a number of uses.

The invention claimed is:

1. A system for cleaning an optical sensor for a motor vehicle, comprising:
   an element for projection of a cleaning liquid;
   a reservoir of the cleaning liquid in fluid communication with the element for projection of cleaning liquid;
   a pump designed to pump the cleaning liquid from the reservoir toward the element for projection of cleaning liquid;
   a wall for confinement of the cleaning liquid that is able to move between a retracted position, in which the confinement wall is positioned outside of the field of view of the optical sensor, and a cleaning position, in which the confinement wall is positioned in front of the optical sensor to define a recovery enclosure for the cleaning liquid; and
   a discharge conduit for the cleaning liquid connected to the recovery enclosure in the cleaning position and to the reservoir of the cleaning liquid.

2. The system as claimed in claim 1, wherein the confinement wall has a spherically shaped cap form, the concave part of which is designed to be oriented toward the optical sensor.

3. The system as claimed in claim 1, wherein the recovery enclosure is positioned higher than the reservoir when the system is in the assembled state such that the cleaning liquid flows under gravity from the enclosure for recovery of the cleaning liquid toward the reservoir.

4. The system as claimed in claim 1, wherein the system comprises an additional pump arranged in the conduit for discharge of the cleaning liquid.

5. The system as claimed in claim 1, wherein the system also comprises a filter arranged in the conduit for discharge of the cleaning liquid.

6. The system as claimed in claim 1, wherein the system comprises a support of the optical sensor and at least a part of the discharge conduit is integrated into the support of the optical sensor.

7. The system as claimed in claim 1, wherein the projection element is borne by the confinement wall such as to lie facing the optical sensor in the cleaning position.

8. The system as claimed in claim 7, wherein the confinement wall comprises an internal supply duct connected in a fluid manner to the projection element.

9. The system as claimed in claim 1, wherein the confinement wall is able to move in rotation.

10. The system as claimed in claim 1, comprising an actuator that moves the confinement wall between the retracted position and the cleaning position.

11. The system as claimed in claim 10, wherein the actuator is an electric actuator that has an output shaft coupled to the confinement wall.

12. The system as claimed in claim 10, wherein the actuator comprises a hydraulic ram comprising:
   a ram body comprising an input end fitting in fluid communication with the pump and an output end fitting in fluid communication with the projection element,
   a piston separating the ram body into a first chamber in fluid communication with the input end fitting and a second chamber,
   said piston being able to move between a proximal position, in which the volume of the first chamber is minimal and in which the output end fitting is in fluid communication with the second chamber, and a distal position, in which the volume of the first chamber is maximal and in which the output end fitting is in fluid communication with the first chamber such as to supply the projection element with cleaning liquid,
   the movement of the piston from the proximal position to the distal position being generated by the cleaning liquid pumped by the pump.

13. The system as claimed in claim 1, wherein the projection element is a squirter to spray a cleaning liquid at an inlet pressure into the squirter of between 1 and 1.7 bar.

14. The system as claimed in claim 1, further comprising a processing unit to activate the pump.

15. An assembly comprising:
   an optical sensor; and
   a system for cleaning the optical sensor as claimed in claim 1.

* * * * *